(No Model.)
T. J. ALLSOP & E. McKENNA.
Butcher's Tag.
No. 229,514. Patented July 6, 1880.
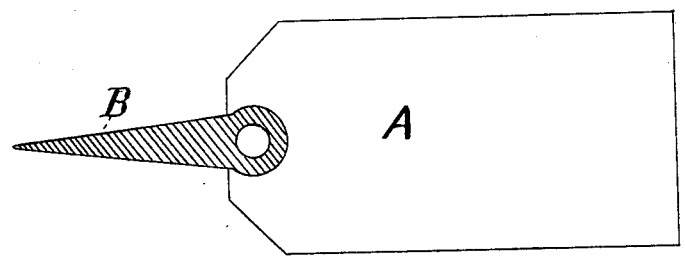
WITNESSES.
A Hurd
Jas J. Thornley
INVENTORS.
Thomas J. Allsop.
Edward McKenna.
Per G. Stackpole
Atty.

UNITED STATES PATENT OFFICE.

THOMAS J. ALLSOP AND EDWARD McKENNA, OF BROOKLYN, NEW YORK.

BUTCHER'S TAG.

SPECIFICATION forming part of Letters Patent No. 229,514, dated July 6, 1880.

Application filed March 17, 1880. (No model.)

*To all whom it may concern:*

Be it known that we, THOMAS J. ALLSOP and EDWARD McKENNA, citizens of the United States, residing in the city of Brooklyn, in the county of Kings and State of New York, have jointly invented a certain new and useful Improvement in Butchers' Tags, of which the following is a specification.

Our invention consists in attaching rigidly to a tag a sheet-metal pointed tapering blade, of tin or other suitable sheet metal, so that to attach the tag you have only to stick the blade into the meat.

The object of our invention is to provide a convenient tag for butchers' use. We accomplish this object by the device illustrated in the accompanying drawing, in which the figure is a plan view of our improved tag.

A is the tag proper. B is the blade attached thereto. The blade is cut or stamped from the sheet metal and pointed at one end, the other end being formed as an eyelet, by which to attach it to the tag.

We do not claim a hook having a cross-bar, in combination with a tag, as claimed by Goodridge in his patent dated October 14, 1873; nor do we claim the combination, with a tag, of a wire fastener having rearwardly-projecting prongs and a cross-bar, over which the tag is folded, as is claimed by Roulstone in his patent dated December 25, 1877.

Having thus described our invention, what we claim as new, and desire to secure by Letters Patent, is—

The tag A, having rigidly secured to it at one end, in the manner shown and described, the pointed tapering sheet-metal blade B, as and for the purpose stated.

THOMAS J. ALLSOP.
EDWARD McKENNA.

Witnesses:
JAS. J. THORNLEY,
AUGUSTUS HURD.